United States Patent [19]

Kammeraad

[11] 3,829,105
[45] Aug. 13, 1974

[54] DOUBLE CUP SEAL

[75] Inventor: James A. Kammeraad, Holland, Mich.

[73] Assignee: K-Line Industries, Inc., Holland, Mich.

[22] Filed: Oct. 25, 1972

[21] Appl. No.: 300,759

[52] U.S. Cl............... 277/183, 123/188 P, 277/189
[51] Int. Cl........................ F16j 15/32, F16k 41/00
[58] Field of Search.......................... 277/181-186, 277/187, 188, 189; 123/188, 188 P

[56] References Cited
UNITED STATES PATENTS
3,379,445   4/1968   Fisher................................. 277/187

Primary Examiner—Louis R. Prince
Assistant Examiner—Robert I. Smith
Attorney, Agent, or Firm—Price, Heneveld, Huizenga & Cooper

[57] ABSTRACT

A valve seal assembly for sealing the valve stem of a valve reciprocally mounted in a valve guide of an internal combustion engine, the valve guide including an extending shoulder portion. Upon installation, the seal assembly automatically accommodates any eccentricities due to the location of the valve stem in the shoulder portion. The assembly includes inner and outer cup members retaining a laterally movable, self-adjusting, frusto-conical Teflon sealing member in sealing engagement with the valve stem. When the assembly is telescoped over the valve stem and extending shoulder portion of the valve guide, an inturned, annular flange on the outer cup is permanently deformed causing an axial shift of the inner cup which engages and locks the sealing member in its aligned position with the valve stem.

16 Claims, 4 Drawing Figures

PATENTED AUG 13 1974　　　　　　　　　　　　　　3,829,105

DOUBLE CUP SEAL

This invention relates to fluid seals for shafts, especially reciprocating shafts, and more particularly, to a valve seal for internal combustion engines for preventing excessive amounts of lubricating oil from the upper valve assemblies from being drawn through the valve guide in which the valve is mounted into the combustion chamber of the engine.

BACKGROUND OF THE INVENTION

Positive valve seals for poppet valves in internal combustion engines are very well known. Typically, such seals are seated on an extending shoulder position of the valve guide with a sealing member sealingly engaging the valve stem. Due to the production tolerances utilized in mass producing such engines, a certain amount of eccentricity generally exists between the exterior of the extending shoulder portion and the location of the valve stem therein. Rigid, relatively laterally-inflexible valve seals have been unable to cope with such eccentricities with complete effectiveness.

Certain previous valve seals have included the feature of utilizing a laterally movable sealing member which adjusts for the troublesome eccentricities. See, e.g., U.S. Pat. No. 3,069,175. These previously-known, laterally movable valve seals have generally included a relatively large number of parts necessitating large overall dimensions in order to effectively mount the laterally movable seal. Further, the greater number of parts and relative complexity of the previous seals have tended to reduce their effectiveness and durability over long periods of time. In addition, the higher cylinder head temperatures required for increased pollution control in recently developed engines have required greater heat resisting ability for such valve seals.

SUMMARY OF THE INVENTION

Accordingly, it is the purpose of the present invention to provide a simply designed, durable, heat-resistant, highly effective valve seal for internal combustion engines and other applications wherein shafts, and especially reciprocating shafts, must be sealed from excessive amounts of lubricating oils and other fluids. The novel valve seal includes the concept of providing a laterally movable, self-aligning, sealing member for overcoming the eccentricities typically present between the shaft and the shaft guide over which the seal is mounted but avoids the aforementioned problems of previous seals including this feature. An accompanying purpose is to provide a valve seal in which the laterally movable sealing member aligns itself during the installation of the seal over the shaft to be sealed, while including means for engaging and locking the self-aligning, sealing member in its aligned position following that installation. The present invention also is more simply designed and constructed and includes relatively fewer parts than previously known laterally movable valve seals.

In accordance with these objects and purposes, the present invention provides a novel valve seal assembly including in combination inner and outer retaining cup members, the inner retaining member being telescoped into and slidably coaxially received within the outer member. The inner and outer retaining members each include an open end and a closed end, the closed ends having an aperture formed centrally therein. When fitted together, the closed ends are adjacent one another and retain therebetween a portion of a flexible, resilient, heat-resistant, lubricious plastic sealing member preferably made from Teflon. The Teflon sealing member includes an opening for sealingly receiving the shaft. The outer retaining cup member includes an annular inturned flange at the open end thereof which engages and supports the open end of the inner retainer cup member.

The novel valve seal assembly of the present invention is generally inserted by telescoping the seal over both the valve stem and extending shoulder portion of the valve guide after the valve stem has been mounted therein. The valve stem is received through the aperture and openings of the two retaining cup members and sealing member. As the annular, permanently deformable flange on the outer member engages the extending shoulder portion of the valve guide, the retaining cup members are aligned with the shoulder portion. Simultaneously, the lateral mobility of the Teflon sealing member allows the sealing member to shift in order to accommodate any eccentricities between the valve stem and the exterior of the shoulder portion. As the seal assembly is pressed further onto the extending shoulder, the annular flange is permanently deformed upwardly toward the closed cylinder ends, thereby causing the inner cup member to shift axially toward the closed end of the outer member. This resultant axial shift causes the Teflon sealing member to be securely engaged and locked in its self-aligned position with respect to the valve stem as the seal assembly is brought to rest against the end surface of the extending shoulder portion of the valve guide. The deformation of the permanently deformable annular flange also accommodates for any irregularities in the shape of the exterior of the extending shoulder portion.

Consequently, it will be understood that the novel valve seal assembly of the present invention generally includes three separate and cooperating parts which are combined in a simple yet effective way to allow the assembly to accommodate the above-noted eccentricities. In addition, the Teflon sealing member is durable and will withstand extremely high and prolonged temperatures. Further, the overall dimensions of the novel assembly are minimized, permitting the seal to be utilized in the relatively limited spaces available in modern engines.

These and other objects, purposes, advantages and features of the invention will become more apparent from a study of the following description taken in conjunction with the drawings.

DESCRIPTION OF THE PREFERRED EMBODIMENT

Figure 1:
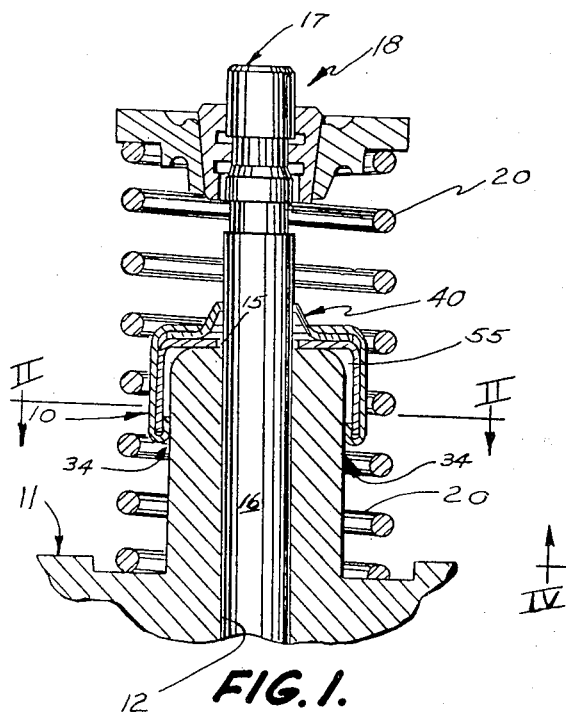
FIG. 1 is a fragmentary, enlarged, cross-sectional view of the upper portion of a typical valve assembly, the valve seal assembly of the present invention being shown telescoped over the valve stem and extending shoulder portion thereof in its operative, sealing position.
Figure 2:
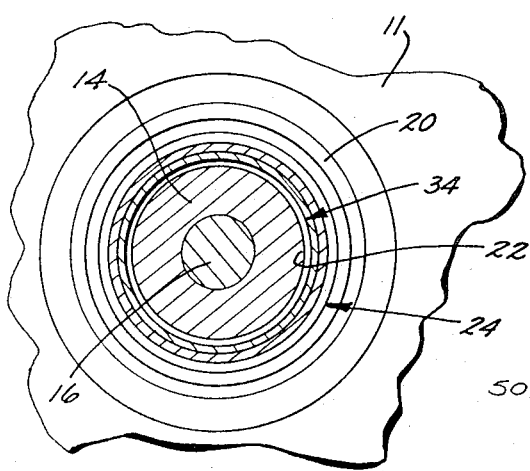
FIG. 2 is a cross-sectional, fragmentary view of the valve seal assembly as installed on the extending shoulder portion taken along plane II—II of FIG. 1.

Referring now to the drawings in greater detail, FIGS. 1 and 2 show the valve seal assembly 10 of the present invention installed on the extending, cylindrical, shoulder portion 14 of a valve guide 12 in a typical cylinder head 11. The valve seal assembly 10 sealingly engages or contacts the valve stem 16 of a poppet valve 17, which valve stem is reciprocally received in a valve guide 12. The valve 17 includes a head portion (not shown) which closes a valve port in the combustion chamber of the engine (not shown), the valve being biased into a closed position by means of the valve-retaining means 18 and spring or springs 20 in the conventionally known manner. An upper assembly including an overhead cam or rocker arm assembly (not shown) is used to reciprocate the valve stem in the valve guide in coordination with the engine. Generally, then, the valve seal assembly 10 of the present invention is telescoped over the shoulder portion 14 while sealingly contacting the valve seam 16, the seal assembly automatically adjusting and accommodating for any eccentricities in the shape or contour of the exterior of the shoulder 14 and the location of the stem 16 in valve guide 12. The seal assembly 10 is seated on the generally planar top surface 15 of extending shoulder portion 14 and is retained thereon by the engagement of the inturned, annular flange 34 which cooperates in a novel manner to engage and lock the self-adjusting, sealing member 40 in alignment with the valve stem 16.

Figure 3:
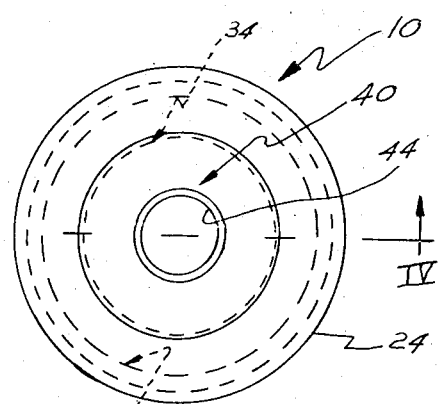
FIG. 3 is a top, plan view of the valve seal assembly of the present invention.
Figure 4:
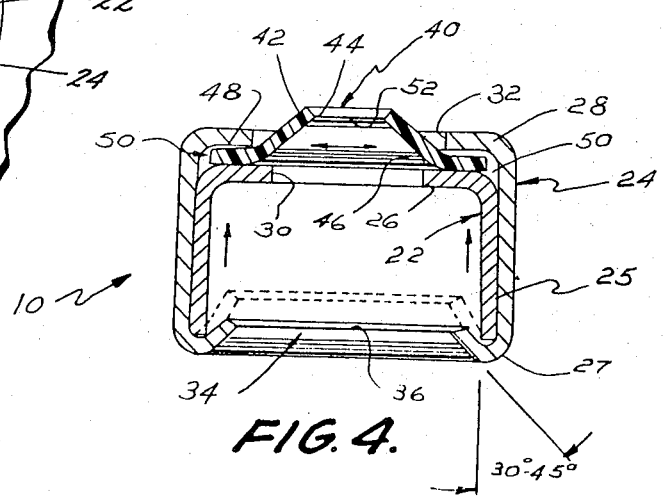
FIG. 4 is a cross-sectional, side elevation of the valve seal assembly taken along plane IV—IV of FIG. 3.

As shown in FIGS. 2 through 4, the valve seal assembly 10 includes and outer cooperating, cylindrical cup retaining members 22 and 24. Each cup member includes open and closed ends 25, 26 and 27, 28, respectively. The closed ends 26 and 28 include centrally located, circular apertures 30 and 32, respectively therein, forming the radially inwardly extending annular lips between which the seal member is positioned. The inner cup 22 is telescoped into and axially slidably recived within the outer cup 24 such that the closed end 26 of the inner member is generally parallel and adjacent to the closed end 28 of outer cup 24. It will be understood that the outside diameter of the inner cup 22 is slightly less than the inside diameter of the outer cup 24 in order to provide the aforementioned, axially slidable fit.

Also included on the outer cup 24 is an integral, upwardly and inwardly formed, annular flange 34 extending around the entirety of the inner periphery of the open end 27 of the outer cup 24. In this respect, the outer cup 24 with flange 34 is similar to the seal retainer described in U.S. Pat. No. 3,531,134 issued to John H. Kammeraad. Flange 34 extends upwardly and inwardly into the interior area of the cup 22 at an angle within the range of about 30° to 45° in the preferred embodiment as shown in FIG. 4. When the inner cup 22 is recieved within the outer cup 24, the open end 25 of the inner cup will rest on and be supported by the annular flange 34. The annular flange 34 is formed after the valve seal is assembled and is permanently deformable when the valve seal assembly 10 is installed on the shoulder portion 14 of valve guide 12. Deformable flange 34 includes a sharp edge 36 which engages the circumference of the shoulder portion thereby retaining the assembly 10 thereon. The flange 34 deforms to accommodate the shape or contour of the shoulder 14, including any irregularities and diameter tolerances therein. It will be understood the flange 34 is initially formed with an inside diameter smaller than the diameter of the smallest production tolerance shoulder with which the seal is to be utilized in accordance with the teachings of the aformentioned U.S. Pat. No. 3,531,134. The relative tolerances on the seal assembly and engine must be such as to insure sufficient deformation of the inturned flange 34 throughout the shoulder tolerance range to shift the inner cup upwardly into tight engagement with the Teflon seal member discussed hereinafter.

Retained between the adjacent, closed end portions 26 and 28 of cup members 22 and 24, is the flexible, resilient, heat-resistant, sealing member 40. Sealing member 40 includes a generally frusto-conical portion 42 including a circular aperture 44 at the smaller, upper end thereof, and a generally larger, circular aperture or opening 46 at the larger, lower end thereof. Integrally formed with the frusto-conical portion 42, and extending in a plane generally perpendicular to the axis of the frusto-conical portion, is a generally planar, annular flange 48 extending therearound. The flange 48 extends radially outwardly to provide a sufficient area to be securely grasped, engaged, and locked between the closed end portions 26 and 28 of the respective cup retaining members. However, the diameter of flange 48 is sufficiently small to provide an annular space 50 between the edge of the annular flange 48 and the inside of the cylindrical sidewalls of the outer cup member 24. As mentioned above, this annular space 50 provides a sufficient area to allow the sealing member 40 to move in a direction laterally of the common axis of the sealing member and the valve assembly as the valve seal is inserted over the valve stem and extending shoulder portions of the valve guide. In this connection, it will be understood that prior to the installation of the valve seal assembly 10, the closed end portions 26 and 28 do not grasp or lock the sealing member 40 in a permanent position. Rather, before installation, sealing member 40 slides freely transverse to or laterally of the direction of the common central axis of cup members 22 and 24. Thus, sufficient lateral mobility of the sealing member 40 is provided allowing the member 40 to slide in the annular space 50 to accommodate any eccentricities between the valve stem and shoulder portion encountered during the installation of the valve seal.

Further, the end openings 44 and 46 of the frusto-conical portions 42 are substantially aligned with the central apertures 30 and 32 and closed end portions 26 and 28, thereby allowing the valve stem 16 to be received directly therethrough. The sealing member 40 also includes a sharp edge 52 around the inner diameter of the upper end opening 44. Edge 52 is the edge which is actually in contact with the valve stem 16 and which performs the sealing function of preventing excess lubricating oil from the upper valve assemblies from draining down through the valve guide into the combustion chamber. The diameter of opening 44 is slightly smaller than the diameter of valve stem 16, the opening 44 being expanded somewhat thereby in order to provide a tight, sealing engagement between the sealing edge 52 and the valve stem. In addition, the diameter of aperture 30 is larger than the diameter of valve stem 16 thereby allowing for any eccentric location of the valve stem in shoulder portion 14. The diameter of aperture 32 is larger than the diameter of aperture 30 thereby providing space for the transition area between portion 42 and annular flange 48 of sealing member 40. This difference in diameters also provides space for the lateral movement of the sealing member.

In the preferred embodiment, the sealing member 40 is preformed in its frusto-conical shape and made from Teflon having a preferred thickness of approximately 0.020 inches. Although other similar flexible, resilient materials may be used, Teflon has been found to be the best available material for use as the sealing member since it provides the best combination of durability, heat resistance and long life. Also, in the preferred embodiment, the inner and outer cups 22 and 24 are preferably formed from cold-rolled steel having a thickness of approximately 0.015 inches. This type of steel provides cup 22 and flange 34 with the proper malleability required to retain the seal 10 in position on shoulder 14.

Referring now to FIGS. 1 and 4, the operation of the novel valve seal assembly 10, when inserted over the extending portion 14 of a valve guide 12 including valve stem 16 mounted therein, will be described in greater detail. Initially, the assembly 10 is placed over the end of the valve stem 16 and pushed downwardly along the exposed length thereof. During this downward movement, the upper end opening 44 of seal member 40 is enlarged somewhat as it conforms to the generally circular cross-sectional shape of the somewhat larger diameter valve stem. As the downward movement continues, the upper end of the extending shoulder portion 14 of valve guide 12 is received through the open end of outer cup 24. The extending shoulder portion may be chamfered somewhat, as shown at 55 in FIG. 1, to guide the insertion thereover. As the assembly is telescoped over the shoulder portion 14, the annular flange 34 is permanently deformed upwardly and inwardly, toward the closed end portions of the cup members. The flange 34 deforms to accommodate any irregularities in the shape or contour of shoulder 14. Further, this upward and inward deformation, shown in phantom in FIG. 4, causes an axial shift or movement of the inner cup 22 toward the closed end portion 28 of outer cup 24. The axial shift results since inner cup 22 rests on the interior of flange 34, the flange being shifted slightly upwardly upon installation on the shoulder portion.

Simultaneously, as the cups 22 and 24 are telescoped over the shoulder portion 14, the sealing member 40 is aligning or adjusting itself to the eccentricities between the exterior of the shoulder portion 14 and the location of valve stem 16 therein by means of the lateral mobility or movement described above. This lateral movement is allowed by the sliding retention of the annular flange 48 between closed end portions 26 and 28 of cup members 22 and 24. As the annular flange 34 deforms upwardly and inwardly, to adjust to the contour of the slightly larger shoulder portions 14, the accompanying axial shift of the inner cup 22 causes the annular flange 48 to be engaged, grasped, and locked in its self-aligned position between the closed end portions 26 and 28. Subsequently, as the valve assembly 10 is brought to rest and seated on the planar end surface 15 of shoulder portion 14, the annular flange 48 is firmly squeezed or compressed between portions 26 and 28 to securely retain it in its aligned position.

The valve assembly is retained in its aligned position by means of the engagement of flange 34 and edge with the outer diameter of the shoulder. Flange 34 firmly engages the sides of the shoulder portion 14 and prevents any axial movement of the entire asembly 10 thereon. The diameter of the flange 34 is such that it will conform to the exterior dimension tolerances of and any irregularities in the contour of shoulder portion 14 since it is smaller in diameter than the outer diameter of the shoulder portion. Further, the annular flange 34 will generally retain the sidewalls of the cup members 22 and 24 slightly spaced from the exterior of the shoulder portion 14, as shown in FIG. 1, although for shoulder portions approaching the maximum tolerance limits of the seal assembly, the space will be quite small.

As will now be understood, the present novel valve seal assembly provides a unique valve seal which aligns itself and accommodates the various eccentricities of mass-produced internal combustion engine valves, and yet one which is simply designed and manufactured and easily installed on such engines. The valve seal assembly of this invention combines fewer parts and smaller overall dimensions than have been previously known in other valve seals incorporating the laterally movable seal concept and yet is effective and durable in operation under sustained, high temperature conditions. The flexible resilient Teflon sealing member will move laterally to adjust itself to the location of the valve stem even when eccentrically located within the extending shoulder portion of the valve guide and will be securely and automatically engaged and locked in the aligned position by the inherent cooperation of the novel combination of elements included in the valve seal assembly.

While one form of the invention has been shown and described, other forms will now be apparent to those skllled in the art. Therefore, it will be understood that the embodiment shown in the drawings and described above is merely for illustrative purposes, and is not intended to limit the scope of the invention defined by the claims which follow.

It will also be understood that the use of the terms "top," "bottom," "upper," "lower," "upwardly," "downwardly" and the like are included for explanation purposes only and are not intended to limit the scope of the invention described.

The embodiments of the invention in which an exclusive property or privilege is claimed are defined as follows.

1. A valve seal assembly for valves in internal combustion engines, said assembly adapted to be telescoped over a valve stem of a valve of an internal combustion engine and an extending shoulder of a valve guide in which said valve is mounted; said assembly including in combination inner and outer coaxial retaining members laterally movably retaining a flexible, resilient, heat-resistant, lubricious plastic sealing member between portions thereof; said inner member being slidable axially within said outer member; said outer member including an inturned permanently deformable flange means for retaining said assembly on said shoulder when telescoped thereover and for sliding said inner member to engage, compress and retain said sealing member between said portions in alignment with the valve stem; said flange means extending inwardly and toward said portions.

2. The valve seal assembly of claim 1 wherein said retaining members are cylindrical cups each including a closed end having a central circular aperture therein and an open end; said sealing member having aperture means for sealingly receiving said shaft; said aperture means, said apertures and open ends being substantially aligned along the common axis of said cylindrical cups for receiving a valve stem therethrough.

3. The valve seal assembly of claim 2 wherein said sealing member includes a generally frusto-conical portion including said aperture means and an integral annular flange, said annular flange being laterally movably retained between said closed ends of said cylindrical cups.

4. The valve seal assembly of claim 2 wherein said inner retaining member is mounted in axially sliding engagement within said outer retaining member.

5. A fluid seal assembly adapted for use in combination with a shaft reciprocally mounted in a shaft guide which includes an extending shoulder portion; said assembly being telescopable over said extending shoulder portion and thereafter sealingly engaging said shaft; said assembly comprising in combination inner and outer coaxial retaining cups each having an open end and a generally closed end including a central aperture therein, and a flexible, resilient sealing member having aperture means for sealingly receiving said shaft, said aperture means being substantially aligned with said central apertures in said closed ends, said sealing member being laterally movably mounted between said closed ends; said outer cup including a permanently deformable, inturned flange extending inwardly and toward said closed ends from said open end thereof; said inner cup being axially shiftable within said outer cup between said flange and said closed end of said outer cup; said flange being adapted to deform permanently toward said closed ends during telescoping of said assembly over said shoulder; the relative axial measurements of said inner and outer cups being such that said flange engages said inner cup during such permanent deformation and shifts the same axially toward the closed end of said outer cup such that said sealing member is engaged, compressed and laterally stabilized between said closed ends and thereafter held in alignment with said shaft once said flange has deformed toward said closed ends a predetermined amount; said sealing member shifting laterally prior to such lateral stabilization to accommodate any eccentricity in the alignment of said shaft and said shoulder.

6. The assembly of claim 5 wherein said sealing member is a heat-resistant, resilient, lubricious, plastic seal having a generally frusto-conical portion including said aperture means and an integral annular flange extending generally perpendicular to the axis of said frusto-conical portion, said annular flange being mounted between said closed cup ends.

7. The assembly of claim 6 wherein said sealing member is Teflon.

8. The assembly of claim 5 wherein said inner and outer retaining cups are cylindrical in shape; said central apertures and said aperture means are circular; and said permanently deformable flange is annular and includes a relatively sharp edge forceably engaging said extending shoulder portion when said assembly is telescoped thereover.

9. The assembly of claim 8 wherein:
said central apertures have a diameter larger than the diameter of said shaft;
the diameter of said aperture means is slightly smaller than said shaft diameter; and
the inner diameter of said annular flange is smaller than the diameter of said shoulder portion.

10. The assembly of claim 9 wherein said sealing member includes a sharp edge adapted to contact and form a tight, fluid seal about said shaft.

11. The assembly of claim 10 wherein said sealing member is Teflon.

12. The assembly as set forth in claim 5 wherein each of said inner and outer cups includes a right circular cylindrical section and a radially inwardly extending annular lip forming said closed end, the lip and cylindrical section of each cup being integrally formed from a metal such as cold-rolled steel, the maximum diameter of said seal assembly being no greater than the diameter of the cylindrical section of said outer cup.

13. The assembly as set forth in claim 12 wherein said permanently deformable flange extends about the complete periphery of the open end of said outer cup.

14. A fluid seal assembly adapted for use in an internal combustion engine, the engine having a valve guide including an extending shoulder portion and a valve including a valve stem reciprocally mounted within said guide, said assembly being adapted to be telescoped over said shoulder portion and thereafter to sealingly engage said reciprocating valve stem; said assembly including in combination inner and outer concentric, cylindrical retaining members each having an open end and a closed end including a central aperture therein; said inner retaining member having an outside diameter slightly less than the inside diameter of said outer member such that said inner member is slidably received in said outer member with its closed end adjacent the closed end of said outer member; said inner member having an inner diameter greater than the outer diameter of said shoulder portion; said assembly further including a frusto-conical, flexible, resilient, heat-resistant, lubricious plastic sealing member laterally movably retained between said adjacent closed ends; said outer member including an inturned flange on its open end engaging the open end of said inner member; said flange being permanently deformable toward said closed ends when said assembly is telescoped over said shoulder portion thereby axially shifting the closed end of said inner member toward the closed end of said outer member while said sealing member is moving laterally into alignment with said valve stem; the axial shift of said inner member engaging and compressing a portion of said sealing member between said closed ends thereby holding said sealing member in lateral alignment with said valve stem.

15. The assembly of claim 14 wherein said retaining members are each integrally formed cold-rolled steel cups and said sealing member is a Teflon seal permanently formed in said frusto-conical shape.

16. The assembly of claim 14 wherein said permanently deformable flange on said outer member is at an angle to the plane of the open end thereof; said angle being within the range of between about 30° and 45°.

* * * * *